(12) United States Patent
Garner et al.

(10) Patent No.: US 7,368,710 B2
(45) Date of Patent: May 6, 2008

(54) SAMPLE PREPARATION METHOD

(75) Inventors: Ronald Colin Garner, York (GB); June Valerie Garner, York (GB); Daniel Nichol Leong, York (GB)

(73) Assignee: Xceleron Limited, York (GB)

( * ) Notice: Subject to any disclaimer, the term of this patent is extended or adjusted under 35 U.S.C. 154(b) by 0 days.

(21) Appl. No.: 11/181,888

(22) Filed: Jul. 15, 2005

(65) Prior Publication Data

US 2007/0018091 A1    Jan. 25, 2007

Related U.S. Application Data

(63) Continuation of application No. 10/203,585, filed as application No. PCT/GB01/00528 on Feb. 9, 2001.

(30) Foreign Application Priority Data

Feb. 9, 2000    (GB) ................................. 0002873.8

(51) Int. Cl.
*B01D 59/44* (2006.01)
(52) U.S. Cl. ........................ 250/283; 250/288; 250/286
(58) Field of Classification Search .................... 435/6; 250/282, 288
See application file for complete search history.

(56) References Cited

U.S. PATENT DOCUMENTS

| | | | | |
|---|---|---|---|---|
| 4,824,249 | A | * | 4/1989 | Lucas et al. ................ 356/311 |
| 4,973,841 | A | * | 11/1990 | Purser ........................ 250/282 |
| 5,209,919 | A | * | 5/1993 | Turteltaub et al. .......... 424/1.11 |
| 5,366,721 | A | | 11/1994 | Turteltaub et al. |
| 5,391,870 | A | * | 2/1995 | Purser ........................ 250/298 |
| 5,401,283 | A | * | 3/1995 | Dyer et al. ................... 51/293 |
| 5,661,299 | A | * | 8/1997 | Purser ........................ 250/281 |
| 5,731,153 | A | * | 3/1998 | Lucas et al. ................... 435/6 |
| 5,976,890 | A | * | 11/1999 | Gehre et al. ................ 436/144 |
| 6,849,400 | B1 | * | 2/2005 | Harvey et al. .................. 435/6 |
| 6,867,415 | B2 | * | 3/2005 | Hughey et al. ............. 250/288 |
| 6,994,971 | B1 | * | 2/2006 | Straume et al. ................ 435/6 |
| 2006/0110322 | A1 | * | 5/2006 | Anderson et al. .......... 424/1.11 |
| 2006/0194341 | A1 | * | 8/2006 | Garner et al. ............... 436/518 |

OTHER PUBLICATIONS

"International Search Report" PCT/GB01/00528 dated Oct. 29, 2001.
Freeman et al., "The design of a radiocarbon microprobe for tracer mapping in biological specimens," *Nuclear Instruments & Methods in Physics Research* B52: 405-409 (1990).

* cited by examiner

*Primary Examiner*—Nikita Wells
*Assistant Examiner*—Johnnie L Smith, II
(74) *Attorney, Agent, or Firm*—Sughrue Mion, PLLC

(57) ABSTRACT

The present invention provides a method of sample preparation for use in obtaining elemental isotope ratios of a material by accelerator mass spectrometry. The method comprises forming the material into a sample without any substantial chemical alteration of the material. The invention also provides a sample for use in obtaining elemental isotope ratios of a material.

10 Claims, No Drawings

SAMPLE PREPARATION METHOD

This application is a continuation application of copending patent application, U.S. Ser. No. 10/203,585 filed Aug. 9, 2002, and claims the benefit under 35 USC § 371 from PCT application No. PCT/GB01/00528, filed Feb. 9, 2001, the disclosure of which is incorporated by reference herein in its entirety, which claims the benefit of Great Britain Application Ser. No. 0002873.8, filed Feb. 9, 2000, the disclosure of which is incorporated by reference herein its entirety.

FIELD OF THE INVENTION

This invention relates to a method of sample preparation for use in obtaining elemental isotope ratios of a material by accelerator mass spectrometry (AMS).

BACKGROUND OF THE INVENTION

For short-lived radioisotopes, where the half life is less than a few years, decay measurements are efficient methods of isotope quantification if performed for an appreciable fraction of the mean life or if the sample is large enough to provide a statistically significant number of decays. For isotopes with long mean lives however, these conditions are seldom met; less than 0.012% of a radiocarbon sample with a mean life of 5740 years decays in one year.

Isotope quantification for stable or long-lived isotopes can be achieved using mass spectrometry (MS) which is used to determine isotope ratios (the concentration of rare isotope to the concentration of total element) as low as $10^{-9}$ in microgram to nanogram samples. Natural abundances of isotopes with mean lives from tens to millions of years are $10^{-9}$ to $10^{-9}$ times elemental abundances and cannot be detected efficiently by 'conventional' isotope ratio MS (IRMS). Accelerator mass spectrometry (AMS) which is used for the efficient detection of long-lived isotopes at part-per-quadrillion sensitivities must be employed.

AMS uses the high energy (from 1-30 million volts) of a tandem Van de Graaff electrostatic accelerator to produce positive ions of elements such as carbon, calcium, iodine, chlorine, tritium and aluminium. The system operates initially on negative ions produced from ionisation of a small button of solid sample in a caesium sputter ion source. The tandem accelerator has a collision cell at elevated positive electrical potential in which the accelerated negative ions lose one or more electrons through a collision process and are converted to positive ions. For measurement of the three isotopes of carbon ($^{14}C$, $^{13}C$ and $^{12}C$), AMS separates these by virtue of their different masses, charge and energy, providing data on the isotope ratios to parts per quadrillion sensitivity i.e., attomole to zeptomole levels with high precision.

The use of AMS in radiocarbon dating is well known The technique also has proven applications in oceanography, the food and agrochemical industries and other diverse research areas. The most important application of AMS to the pharmaceutical or biotechnology industry stems from the requirement of using radio-labelled drugs in various aspects of drug research and development, especially in clinical trials of potential new medicines.

Present use of radiolabelled drugs for research in human subjects owing to the radiation exposure is strictly regulated, restricting, wasteful on preliminary safety experiments in animals, time-consuming and costly. Use of radiolabelled drugs in some cases, such as dermal, buccal, vaginal, anal, subcutaneous or nasal application or administration by inhalation, is difficult and sometimes impossible. AMS can substitute high dose (microCuries) for low dose (nanoCuries) radioactive human studies and allows for the acquisition of similar data. The overwhelming advantage of AMS is that it can quantify, with relatively short analytical times, levels of radioactivity that are so low that the dose needed to be administered to a human subject fills below the stipulated levels of radioactivity which require regulatory review.

The ability to obtain human data much earlier in the drug development process is important. Approximately one third of development drugs have to be dropped because of some metabolism problem. Early discovery of these problems will save development time and costs. AMS also offers the advantage that it is possible to obtain measurements in very small samples ranging from micrograms or less of tissue or cells to a few microlitres of blood. The latter has important ethical implications in paediatric studies since only minimal amounts of blood need be drawn. In the case of laboratory rodents this means that instead of using several animals per group, a single animal can be used at each dose level and sequential blood samples removed for analysis.

The problem with any analysis which involves the use of AMS is the bottleneck at the sample preparation end prior to the analysis. In order to analyse elemental isotopes by AMS, the material to be tested must be converted to a form that can yield negative ions within the instrument's ion source. Carbon-containing materials are converted to graphite, halides to silver salts, aluminium to the oxide and calcium to a dihalide or dihydride. Preparation of the samples for use in AMS represents a tedious process which typically requires two days labour.

Current AMS ion sources require samples that are thermally and electrically conductive solids. This material is further constrained by effective chemical isolation of the sample from its matrix. The isolation process must be nonfractionating, efficient and protected from contamination by isobars or unexpected concentrations of the rare isotope in or on laboratory equipment. Uniformity and comparability between samples and standards are ensured by reducing all samples to a homogenous state from which the final target material is prepared. Carbon samples (containing $^{14}C$) are oxidised to $C_2$ before reduction to graphite, commonly produced by the reduction of the $C_2$ by hydrogen or zinc over an iron or cobalt catalyst or binder (see Vogel J S (1992) Rapid production of graphite without contamination for biomedical AMS. Radiocarbon, 34, 344-350).

Oxidation of carbon samples occurs in a sealed tube which is heated in a furnace at temperatures of up to 900° C. with an oxidant such as copper oxide. This process which can lead to sample losses through explosion of glass tubes at this temperature, together with a cooling period, lasts approximately eight hours. The resulting $CO_2$ is reduced to graphite in a second step, after cryogenic transfer which can also result in losses, using a reducing agent such as zinc and titanium hydride and cobalt as a catalyst at temperatures of up to about 500° C. This step is particularly time consuming and lasts approximately eighteen hours with cooling. The prepared cobalt/graphite sample is then compressed into tablet form in a cylindrical aluminium cathode before elemental isotopic ratio analysis in the accelerator mass spectrometer.

U.S. Pat. Nos. 5,209,919 and 5,366,721 disclose conventional methods of sample preparation for AMS analysis. U.S. Pat. No. 5,209,919 combines the reducing abilities of hydrogen and zinc to achieve a more rapid and complete reaction at a lower temperature which produces filamentous graphite with low isotopic fractionation and high ion current output. Although this method is completed in 5 hours instead of the 12-26 hours required when zinc is used alone, this is still a lengthy process when compared with a typical six minute sample analysis time upon the AMS machine.

AMS is an enabling technology with huge potential for speeding up drug development. There remains however a real need for a method of sample preparation which will alleviate the bottleneck in AMS analysis at the sample preparation end.

STATEMENTS OF THE INVENTION

According to the present invention there is provided a method of sample preparation for use in obtaining elemental isotope ratios of a material by accelerator mass spectrometry comprising forming said material into a sample without any substantial chemical alteration of said material.

The present invention also provides a method of obtaining elemental isotope ratios of a material by accelerator mass spectrometry comprising preparing a sample comprising the material and carrying out accelerator mass spectrometry on said sample, wherein the material is substantially chemically unaltered.

Advantageously, the method of the present invention provides a method of sample preparation for accelerator mass spectrometry (AMS) analysis that is both quick (i.e., can be performed in a matter of minutes) and cost effective. Furthermore, compared with prior art techniques, the method of the present invention uses minimal amounts of disposable glass- and plasticware.

Preferably the material for use in sample preparation is carbon ($^{14}C$) containing, although the invention may be used for the detection of other elemental isotopes analysable by AMS e.g., calcium, plutonium, chlorine and iodine. The material may be essentially biological such as an organ, blood, urine, cells or parts of cells of living hosts, including humans. Alternatively the material for use in sample preparation may be environmental such as soil or soil organisms e.g., worms.

Preferably the preparation of a sample including the material includes a drying step but does not involve graphitisation.

Preferably the material is homogeneously mixed with a binder. Preferably the binder is electrically conductive and may be any substance which allows the mixture of material and binder to be compressed into tablet form. More preferably the binder is one or a mixture of any of graphite, cobalt, aluminium powder, aluminium oxide and iron or iron oxide.

Where the isotope to be detected is $^{14}C$, the binder is preferably one or a mixture of graphite, cobalt and aluminium powder. Where the isotope to be detected is plutonium, the binder is preferably one or a mixture of aluminium oxide and iron oxide.

The present invention also provides a sample for use in obtaining elemental isotope ratios of a material, the sample comprising the material which is substantially chemically unaltered.

Preferably the sample for use in obtaining elemental isotope ratios of a material is dry and comprises a binder which is electrically conductive. The binder may be any material which allows the mixture of material and binder to be compressed into tablet form. More preferably the binder is one or a mixture of any of graphite, cobalt, aluminium powder, aluminium oxide and iron or iron oxide.

The method of the present invention relies on the principle of radiocarbon dating. The concentration of $^{14}C$, the longest lived radioisotope of carbon, records the time since the last carbon exchange with the atmosphere, providing information such as the age of an archaeological artefact or the circulation of the world's oceans. Atmospheric $CO_2$ is incorporated into plants as $^{14}C$ which becomes incorporated into animal matter following ingestion. Subsequent to the death of the ingesting animal, no more $^{14}C$ will be incorporated into the animal which will, in time, decay. After 50,000 years the decaying biological substance will be 'dead' or 'inert', containing no more $^{14}C$. Accordingly, since they were formed more than 50,000 years ago, synthetic graphite, or oil from which it is derived, contains no $^{14}C$. Any $^{14}C$ ions which are generated in the accelerator mass spectrometer can therefore be attributed to the sample under test which are detected and quantified.

Using the method of the present invention for the measurement of elemental isotope ratios of a carbon containing material for example, ions of $^{14}C$ are generated in the accelerator mass spectrometer and can be detected. These results are particularly surprising because ionisation of elemental carbon in an organic molecule would not previously have been expected under the conditions which are provided in the invention. It is well known that the sample must be presented to the accelerator mass spectrometer in tablet/pellet form which is both dry and electrically conductive. Mixing the sample to be tested with a binding material such as graphite or aluminium oxide however enables us to satisfy both these requirements whilst bypassing the tedious graphitisation process for ionisation of the test sample.

Whilst conventional mass spectrometry sample preparation techniques make use of direct sample introduction for analysis by electron impact or chemical ionisation, there is no prior teaching which would lead one of skill in the relevant art to apply this method to the field of Accelerator Mass Spectrometry. Indeed, the teaching of sample preparation in the AMS field has clearly pointed away from direct introduction towards more complicated, tedious methods of sample preparation such as graphitisation.

DETAILED DESCRIPTION OF THE INVENTION

The present invention will now be described by way of example only and with reference to a series of experiments which were conducted using human blood plasma or urine as well as the international certificated standard Australian National University sucrose as samples to determine if they could be analysed by AMS without being graphitised.

Sample Preparation

Direct Sample Addition to Graphite

Each of the following samples were prepared in triplicate in plastic screw-cap vials. The mixtures were dried in a Speed-Vac and pressed into cathodes for AMS analysis. The term 'cold plasma' refers to blood plasma alone whilst 'hot plasma' refers to plasma to which a $^{14}C$ labelled drug has been added. Each cathode sample was analysed at least three times and the results are the mean of these triplicate analyses. All cathodes were first apalysed for 1000 cycles (100.7 seconds per sample) followed by a second analysis for 3000 cycles (302.1 seconds per sample).

TABLE 1

Sample preparation details

| Sample condition | Contents |
|---|---|
| 1 | A spatula of synthetic graphite:aluminium powder (7:3 v:v) 5-8 mg cobalt 10 µl HPLC grade water |
| 2 | A spatula of synthetic graphite:aluminium powder (7:3 v:v) 5-8 mg cobalt 10 µl cold plasma |
| 3 | A spatula of synthetic graphite:aluminium powder (7:3 v:v) 5-8 mg cobalt 10 µl hot plasma |
| 4 | A spatula of synthetic graphite:aluminium powder (7:3 v:v) 10 µl HPLC grade water |
| 5 | A spatula of synthetic graphite:aluminium powder (7:3 v:v) 10 µl cold plasma |
| 6 | A spatula of synthetic graphite:aluminium powder (7:3 v:v) 10 µl hot plasma |

Preparation of Plasma Samples

Each test had two parts; the first involved the preparation of samples using the conventional method and a second part used the shorter procedure of admixing the sample directly with graphite/cobalt mixture (prepared from the conventional graphitisation of multiple aliquots of liquid paraffin).

A sample of dosed human plasma was diluted using untreated human plasma to give the following concentrations: (dpm/ml refers to disintegrations per minute per millitre of sample)

| Nominal concentration | Concentration |
|---|---|
| Untreated human plasma (blank) | A |
| 0.05 dpm/ml | B |
| 0.1 dpm/ml | C |
| 0.25 dpm/ml | D |
| 0.5 dpm/ml | E |
| 1.0 dpm/ml | F |
| 2.5 dpm/ml | G |

Conventional Method for Plasma Sample Preparation

Ten microlitres of each concentration of plasma was aliquoted into ten separate glass sample tubes containing baked copper oxide wire and 2.5 µl of liquid paraffin. To serve as standards, 5-7 mg of ANU (Australian National University) sucrose was weighed into six separate glass sample tubes containing baked copper oxide wire. For process controls, 2-3 mg of synthetic gate was weighed into four separate glass sample tubes containing copper oxide wire, while 2.5 µl of liquid paraffin was aliquoted into seven separate glass sample tubes containing baked copper oxide wire. All samples, standards and controls were concentrated to dryness in a Speed-Vac and then sealed under vacuum. All samples standards and controls were oxidised overnight at 900° C. (following the procedure of Vogel J S (1992) Rapid production of graphite without contamination for biomedical AMS. Radiocarbon, 34, 344-350). Samples were then cryogenically transferred and then reduced in a furnace overnight. The resultant graphite was pressed into individual aluminium cathodes ready for AMS analysis. Cathodes were analysed for 2500 cycles at least three times using a 5 million volt National Electrostatics Corporation (NEC) 15SDH-2 tandem Pelletron accelerator mass spectrometer. (Garner R C et al (2000) A validation study comparing accelerator MS and liquid scintillation counting for analysis of $^{14}$C-labelled drugs in plasma, urine and faecal extracts. J. Pharm. and Biomed. Analysis, 24, 197-209).

Admixing Method for Plasma Sample Preparation

Plastic screw-cap vials were labelled with sample codes. To each vial approximately 8.5 mg of liquid paraffin graphite/cobalt mixture (produced by the conventional graphitisation of aliquots of liquid paraffin and the graphite pooled together) was weighed. Twenty five microlitres of each concentration of plasma were aliquoted into ten separate plastic screw-cap vials containing liquid paraffin graphite/cobalt mixture as above. To serve as standards, 5-7 mg of ANU sucrose was dissolved in 500 µl of HPLC grade water, twenty five microlitres were then aliquoted into six plastic screw-cap vials containing a weighed amount of liquid paraffin graphite/cobalt mixture. The vials were capped and vortexed to mix the contents before being concentrated to dryness in a Speed-Vac. The admixed liquid paraffin graphite/cobalt mixture was pressed into individual aluminium cathodes for AMS analysis. To serve as controls, seven aliquots of untreated liquid paraffin graphite/cobalt mixture were pressed directly into aluminum cathodes. All cathodes were analysed for 2500 cycles as described above.

Preparation of Urine Samples

To remove sediment, which precipitates out of solution when the urine samples are thawed, urine samples were centrifuged and the supernatant decanted.

Dosed human urine was diluted with untreated human urine to give the following concentrations:

| Nominal concentration | Concentration |
|---|---|
| Untreated human urine (blank) | A |
| 0.05 dpm/ml | B |
| 0.1 dpm/ml | C |
| 0.25 dpm/ml | D |
| 0.5 dpm/ml | E |
| 2.0 dpm/ml | F |
| 2.5 dpm/ml | G |

Conventional Method for Urine Sample Preparation

This was conducted as per the conventional method for plasma sample preparation described above using urine in place of plasma.

Admixing Method for Urine Sample Preparation

This was conducted as per the admixing method for plasma sample preparation as described above using urine in place of plasma. However, in the first of the three urine tests, 25 µl of each urine sample was used. In the remaining two urine tests, 50 µl was used for admixing. The volume of ANU sucrose solution admixed to the graphite was also increased to 50 µl in the second and third admixing tests for the urine samples.

Preparation of ANU Sucrose Standard

ANU sucrose is one of the International Standards used in AMS analysis (150.61 percent Modem Carbon (pMC)) and is used primarily to normalise the AMS but is also a useful process standard.

According to CBAMS Ltd acceptance criteria, the pMC range allowed following conventional graphitisation is 128.61 to 172.61, see Table 8.

Conventional Method for ANU Sucrose

ANU sucrose was prepared as a process standard in each of the conventional plasma and urine tests described above.

Admixing Method for ANU Sucrose

ANU sucrose was prepared as a process standard in each of the admixing plasma and urine tests as described above.

Data Analysis and Interpretation

AMS Data for Direct Sample Addition to Graphite

Tables 2 and 3 show the AMS results from 1000 and 3000 cycle analyses. The column headed 'average $^{14}C$ counts' refers to the number of $^{14}C$ counts as detected by AMS. The term 'cold plasma' refers to blood plasma alone whilst 'hot plasma' refers to plasma to which a $^{14}C$ labelled drug has been added.

pMC refers to the percentage modern carbon which is an AMS term of radioactivity and provides a measurement of the carbon content of a sample. pMC=Times modern×100. One times modern=$^{14}C/^{12}C$ ratio in the atmosphere in 1952 (i.e., before atmospheric testing of atomic bombs). As shown in Tables 2 and 3, the $^{13}C/^{12}C$ ratio remains relatively constant: The $^{13}C/^{12}C$ ratios are close to the expected value of 1.1. pMC is a combination of the number of counts and the $^{13}C/^{12}C$ ratio.

TABLE 2

AMS data after analysis for 1000 cycles

|  | Average $^{14}C$ counts | $^{13}C/^{12}C$ ratio | Percent Modern Carbon (pMC) |
|---|---|---|---|
| Synthetic graphite:aluminium powder + cobalt + HPLC water 1 | 2 | 1.137 | 1.98 |
| Synthetic graphite:aluminium powder + cobalt + HPLC water 2 | 2 | 1.095 | 1.27 |
| Synthetic graphite:aluminium powder + cobalt + HPLC water 3 | 1 | 1.158 | 1.50 |
| MEAN | 1.7 | 1.130 | 1.583 |
| Synthetic graphite:aluminium powder + cobalt + cold plasma 1 | 59 | 1.061 | 9.64 |
| Synthetic graphite:aluminium powder + cobalt + cold plasma 2 | 120 | 1.043 | 26.08 |
| Synthetic graphite:aluminium powder + cobalt + cold plasma 3 | 53 | 1.071 | 15.03 |
| MEAN | 77.3 | 1.058 | 16.917 |
| Synthetic graphite:aluminium powder + cobalt + hot plasma 1 | 292 | 1.056 | 52.36 |
| Synthetic graphite:aluminium powder + cobalt + hot plasma 2 | 196 | 1.063 | 42.70 |
| Synthetic graphite:aluminium powder + cobalt + hot plasma 3 | 280 | 1.063 | 43.54 |
| MEAN | 256.0 | 1.061 | 46.200 |
| Synthetic graphite:aluminium powder + HPLC water 1 | 7 | 1.130 | 1.74 |
| Synthetic graphite:aluminium powder + HPLC water 2 |  | Sample lost |  |
| Synthetic graphite:aluminium powder + HPLC water 3 | 4 | 1.085 | 0.58 |
| MEAN | 5.5 | 1.108 | 1.160 |
| Synthetic graphite:aluminium powder + cold plasma 1 | 103 | 1.025 | 13.61 |
| Synthetic graphite:aluminium powder + cold plasma 2 | 89 | 1.052 | 14.68 |
| Synthetic graphite:aluminium powder + cold plasma 3 | 103 | 1.028 | 8.56 |
| MEAN | 98.3 | 1.035 | 12.283 |
| Synthetic graphite:aluminium powder + hot plasma 1 | 345 | 1.045 | 39.48 |
| Synthetic graphite:aluminium powder + hot plasma 2 | 323 | 1.026 | 36.17 |
| Synthetic graphite:aluminium powder + hot plasma 3 | 579 | 1.044 | 59.40 |
| MEAN | 415.7 | 1.038 | 45.017 |

TABLE 3

AMS data after analysis for 3000 cycles

|  | Average $^{14}C$ counts | $^{13}C/^{12}C$ ratio | Percent Modern Carbon (pMC) |
|---|---|---|---|
| Synthetic graphite:aluminium powder + cobalt + HPLC water 1 | 4 | 1.179 | 2.29 |
| Synthetic graphite:aluminium powder + cobalt + HPLC water 2 | 5 | 1.144 | 1.95 |
| Synthetic graphite:aluminium powder + cobalt + HPLC water 3 | 5 | 1.190 | 3.93 |
| MEAN | 4.7 | 1.171 | 2.723 |
| Synthetic graphite:aluminium powder + cobalt + cold plasma 1 | 153 | 1.061 | 9.29 |

TABLE 3-continued

AMS data after analysis for 3000 cycles

|  | Average $^{14}$C counts | $^{13}$C/$^{12}$C ratio | Percent Modern Carbon (pMC) |
|---|---|---|---|
| Synthetic graphite:aluminium powder + cobalt + cold plasma 2 | 255 | 1.047 | 24.02 |
| Synthetic graphite:aluminium powder + cobalt + cold plasma 3 | 228 | 1.038 | 14.33 |
| MEAN | 212.0 | 1.049 | 15.880 |
| Synthetic graphite:aluminium powder + cobalt + hot plasma 1 | 786 | 1.061 | 45.92 |
| Synthetic graphite:aluminium powder + cobalt + hot plasma 2 | 513 | 1.069 | 40.42 |
| Synthetic graphite:aluminium powder + cobalt + hot plasma 3 | 1017 | 1.060 | 38.18 |
| MEAN | 772.0 | 1.063 | 41.507 |
| Synthetic graphite:aluminium powder + HPLC water 1 | 9 | 1.155 | 1.01 |
| Synthetic graphite:aluminium powder + HPLC water 2 |  | Sample lost |  |
| Synthetic graphite:aluminium powder + HPLC water 3 | 7 | 1.106 | 0.09 |
| MEAN | 8.0 | 1.131 | 0.550 |
| Synthetic graphite:aluminium powder + cold plasma 1 | 523 | 1.012 | 17.21 |
| Synthetic graphite:aluminium powder + cold plasma 2 | 382 | 1.059 | 17.97 |
| Synthetic graphite:aluminium powder + cold plasma 3 | 425 | 1.022 | 9.92 |
| MEAN | 443.3 | 1.031 | 15.033 |
| Synthetic graphite:aluminium powder + hot plasma 1 | 1187 | 1.050 | 44.31 |
| Synthetic graphite:aluminium powder + hot plasma 2 | 1175 | 1.016 | 38.53 |
| Synthetic graphite:aluminium powder + hot plasma 3 | 2110 | 1.038 | 70.49 |
| MEAN | 1490.7 | 1.035 | 51.110 |

It should be understood that Tables 2 and 3 illustrate AMS results for the same samples and are the means of at least three analyses per cathode sample, the only difference between them being that the samples in Table 3 were run for three times as long (i.e., 3000 cycles in Table 3 as compared with 1000 cycles in Table 2). The term 'cycle' refers to the AMS counting time.

As shown in the tables, the average number of counts for the mixture of synthetic graphite, aluminium powder, cobalt and water mixture results is low. Addition of the sample plasma results in an increased number of counts with approximately three times as many counts recorded for hot plasma as compared with cold plasma.

AMS Data for Conventional and Admixed Plasma Samples

Tables 4 and 5 show the dpm/ml of plasma obtained by AMS using the conventional and admixing methods respectively. The test was repeated twice more, and similar data was obtained to that shown in Tables 4 and 5.

TABLE 4

AMS data for the conventional preparation of plasma samples

|  | Concentration | | | | | | |
|---|---|---|---|---|---|---|---|
|  | A | B | C | D | E | F | G |
| dpm/ml of | Sample lost | Sample lost | 0.7442 | 0.8207 | 1.0945 | 1.7553 | 3.6039 |
| ten | 0.5397 | 0.6799 | 0.6730 | 0.8969 | 1.3297 | 1.8721 | 3.1556 |
| replicates | 0.5353 | 0.5971 | 0.6923 | 0.8754 | 1.0895 | 1.6377 | Sample lost |
| per concentration | 0.6250 | 0.6493 | 0.8052 | 0.9046 | 1.1842 | 1.6422 | 3.1172 |
|  | 0.5731 | 0.6609 | 0.7809 | 1.0015 | 1.2196 | 1.8243 | 3.4794 |
|  | 0.5698 | 0.6239 | 0.8431 | 0.9018 | 1.3109 | 2.0468 | 3.3491 |
|  | 0.5703 | 0.6112 | 0.7376 | 1.1155 | 1.0907 | 1.7694 | 3.1498 |
|  | 0.7420 | 0.6341 | 0.9168 | 0.9148 | 1.2651 | 1.7007 | 3.6497 |
|  | 0.5510 | 0.7086 | 0.7876 | 0.9187 | 1.1713 | 2.0590 | 3.4924 |
|  | 0.6352 | 0.7183 | 0.7285 | 0.8364 | 1.4437 | 1.7175 | 2.9958 |
| Mean | 0.5935 | 0.6537 | 0.7709 | 0.9186 | 1.2199 | 1.8025 | 3.3325 |
| SD | 0.0656 | 0.0422 | 0.0726 | 0.0849 | 0.1181 | 0.1508 | 0.2361 |
| CV (%) | 11.05% | 6.45% | 9.41% | 9.24% | 9.68% | 8.36% | 7.09% |
| Mean minus blank | 0.0000 | 0.0602 | 0.1774 | 0.3251 | 0.6264 | 1.2090 | 2.7391 |

TABLE 5

AMS data for the admixing preparation of plasma samples

| | Concentration | | | | | | |
|---|---|---|---|---|---|---|---|
| | A | B | C | D | E | F | G |
| dpm/ml of | 0.4950 | 0.4897 | 0.8079 | 0.7341 | 1.4923 | 2.0375 | 2.9351 |
| ten | 0.4740 | 0.5299 | 0.4899 | 1.0175 | 1.3144 | 1.6083 | 3.0308 |
| replicates | 0.5189 | 0.4550 | 0.6944 | 0.9645 | 1.3188 | 2.1936 | 4.3896 |
| per concentration | 0.5019 | 0.5628 | 0.5158 | 0.7089 | 0.8537 | 1.8988 | 3.7038 |
| | 0.4129 | 0.4694 | 0.6545 | 0.8713 | 1.1245 | 1.6983 | 2.7460 |
| | 0.3749 | 0.4578 | 0.6497 | 0.8410 | 1.2209 | 1.5362 | 2.8547 |
| | 0.4653 | 0.5671 | 0.6367 | 0.9355 | 1.4140 | 1.8840 | 3.1663 |
| | 0.3184 | 0.6287 | 0.6359 | 0.8217 | 1.1529 | 1.7560 | 2.9769 |
| | 0.4327 | 0.4721 | 0.6631 | 0.7371 | 0.9804 | 2.0348 | 3.5834 |
| | 0.3506 | 0.5094 | 0.6500 | 0.8683 | 0.9856 | 1.3643 | 3.2140 |
| Mean | 0.4345 | 0.5142 | 0.6398 | 0.8500 | 1.1857 | 1.8012 | 3.2601 |
| SD | 0.0686 | 0.0574 | 0.0882 | 0.1034 | 0.2052 | 0.2564 | 0.5006 |
| CV (%) | 15.79% | 11.16% | 13.79% | 12.17% | 17.30% | 14.24% | 15.35% |
| Mean minus blank | 0.0000 | 0.0797 | 0.2053 | 0.4155 | 0.7513 | 1.3667 | 2.8256 |

AMS Data for Conventional and Admixed Urine Samples

Tables 6 and 7 show the dpm/ml of urine obtained by AMS using the conventional and admixing methods respectively. Concentrations A-G refer to different levels of radioactivity.

The test was repeated twice more, and similar data was obtained to that shown in Tables 6 and 7.

TABLE 6

AMS data for the conventional preparation of urine samples

| | Concentration | | | | | | |
|---|---|---|---|---|---|---|---|
| | A | B | C | D | E | F | G |
| dpm/ml of | 0.0652 | 0.1279 | 0.1682 | 0.2800 | 0.5582 | 1.1395 | 3.5234 |
| ten | 0.0876 | 0.1101 | 0.1729 | 0.3210 | 0.5265 | 1.1121 | 2.3830 |
| Replicates | 0.0783 | 0.1387 | 0.1642 | 0.3329 | 0.6321 | 1.2407 | 3.1311 |
| per concentration | 0.0830 | 0.1123 | 0.1563 | 0.2937 | 0.6736 | 1.2851 | 3.1162 |
| | 0.0803 | 0.1358 | 0.1793 | 0.3002 | 0.7500 | 1.1691 | 3.1374 |
| | 0.0731 | 0.1292 | 0.1691 | 0.3032 | 0.6547 | 1.1612 | 2.9206 |
| | 0.0794 | 0.1380 | 0.1743 | 0.3363 | 0.6042 | 1.1857 | 2.7134 |
| | 0.0860 | 0.1159 | 0.1687 | 0.4016 | 0.6589 | 1.1691 | 2.9274 |
| | 0.0718 | 0.1211 | 0.2063 | 0.2975 | 0.5999 | 1.1821 | 3.2210 |
| | 0.0763 | 0.1369 | 0.1716 | 0.3144 | Sample lost | 1.2254 | 2.9091 |
| Mean | 0.0781 | 0.1266 | 0.1731 | 0.3181 | 0.6287 | 1.1870 | 2.9983 |
| SD | 0.0068 | 0.0110 | 0.0132 | 0.0343 | 0.0663 | 0.0508 | 0.3082 |
| CV (%) | 8.70% | 8.71% | 7.62% | 10.77% | 10.55% | 4.28% | 10.28% |
| Mean minus blank | 0.0000 | 0.0485 | 0.0950 | 0.2400 | 0.5506 | 1.1089 | 2.9201 |

TABLE 7

AMS data for the admixing preparation of urine samples

| | Concentration | | | | | | |
|---|---|---|---|---|---|---|---|
| | A | B | C | D | E | F | G |
| dpm/ml of | 0.0530 | 0.0979 | 0.2491 | 0.4177 | 0.5615 | 1.1352 | 4.6255 |
| ten | 0.0753 | 0.1615 | 0.1652 | 0.3600 | 1.0042 | 1.5127 | 4.0590 |
| Replicates | 0.0550 | 0.1222 | 0.2250 | 0.3281 | 0.6225 | 1.0576 | 2.2525 |
| per conc- | 0.0600 | 0.1061 | 0.1661 | 0.3248 | 0.6571 | 1.1326 | 4.1390 |
| Entration | 0.0351 | 0.1106 | 0.1199 | 0.3400 | 0.8908 | 1.7144 | 3.9320 |
| | 0.0365 | 0.1892 | 0.1050 | 0.3716 | 0.4952 | 1.1820 | 3.0484 |
| | 0.0549 | 0.1968 | 0.1554 | 0.3480 | 0.6369 | 1.0317 | 3.1878 |
| | 0.0458 | 0.2400 | 0.1157 | 0.4451 | 0.7012 | 1.5538 | 2.6703 |
| | 0.0641 | 0.1463 | 0.1671 | 0.5357 | 0.8502 | 0.9055 | 2.9642 |
| | 0.0915 | 0.1662 | 0.1914 | 0.4266 | 0.5048 | 1.2337 | 2.1058 |

TABLE 7-continued

AMS data for the admixing preparation of urine samples

| | Concentration | | | | | | |
|---|---|---|---|---|---|---|---|
| | A | B | C | D | E | F | G |
| Mean | 0.0571 | 0.1537 | 0.1660 | 0.3898 | 0.6925 | 1.2459 | 3.2984 |
| SD | 0.0171 | 0.0460 | 0.0466 | 0.0666 | 0.1706 | 0.2608 | 0.8528 |
| CV (%) | 29.95% | 29.95% | 28.06% | 17.09% | 24.64% | 20.93% | 25.85% |
| Mean minus blank | 0.0000 | 0.0966 | 0.1089 | 0.3326 | 0.6353 | 1.1888 | 3.2413 |

AMS Data for Conventional and Admixed ANU Sucrose Standard

The data obtained from the admixng analyses of the ANU sucrose has been collated from all tests. ANU sucrose is the National Standard, being 150.61 pMC.

The dpm/g of ANU sucrose was calculated using pMC values obtained following conventional processing, as follows:

| | |
|---|---|
| 150.61 | The expected standard value of ANU sucrose |
| 128.61 | The lowest pMC allowed in CBAMS Ltd acceptance criteria |
| 172.61 | The highest pMC allowed in CBAMS Ltd acceptance criteria |

TABLE 8

Conversion of ANU sucrose pMC limits to dpm/g devised from the acceptance criteria range as stated above

| CBAMS ID | Percent Modern Carbon (pMC) | Times Modern (pMC/100) | Atto-moles $^{14}$C/mg C | Total carbon in ANU sucrose graphite (mg) | Total atto-moles $^{14}$C | dpm | Mass of ANU sucrose used (mg) | dpm per mg of ANU sucrose | dpm per gram of ANU sucrose |
|---|---|---|---|---|---|---|---|---|---|
| ANU sucrose | 150.61 | 1.5061 | 147.5978 | 2.52 | 371.9465 | 0.0515 | 6.00 | 0.0086 | 8.5775 |
| ANU sucrose | 128.61 | 1.2861 | 126.0378 | 2.11 | 265.3726 | 0.0367 | 5.00 | 0.0073 | 7.3438 |
| ANU sucrose | 172.61 | 1.7261 | 169.1578 | 2.95 | 498.6264 | 0.0690 | 7.00 | 0.0099 | 9.8562 |

Using this information, the calculated dpm/g values of the admixed ANU sucrose solutions should be in the range 7.3438-9.8562 dpm/g.

pMC values obtained from admixed standards were converted to dpm/g of ANU sucrose to compare with the dpm/g value of ANU sucrose when graphitised by conventional means. Table 9 shows some representative data for admixed ANU sucrose solution.

TABLE 9

Conversion of admixed ANU sucrose pMC values to dpm/g

| CBAMS Sample code | CBAMS ID | Mass of graphite/Co used (mg) | Percent modern carbon (pMC) | Volume of ANU sucrose solution used (ul) | dpm per ml | dpm/g | Mean dpm/g | Standard deviation | Co-efficient of variation % |
|---|---|---|---|---|---|---|---|---|---|
| Experiment 1 | ANU | 9.4 | 7.55 | 25.00 | 0.0919 | 6.7562 | 7.6047 | 0.62 | 8.10% |
| | sucrose | 5.6 | 14.41 | 25.00 | 0.1096 | 8.0606 | | | |
| | solution | 6.5 | 11.81 | 25.00 | 0.1026 | 7.5432 | | | |
| | admixed | 10.6 | 7.98 | 25.00 | 0.1096 | 8.0587 | | | |
| Experiment 2 | ANU | 6.6 | 12.02 | 25.00 | 0.1064 | 7.8257 | 7.9742 | 3.25 | 40.71% |
| | sucrose | 8.3 | 14.99 | 25.00 | 0.1660 | 12.2088 | | | |
| | solution | 6.4 | 6.96 | 25.00 | 0.0585 | 4.3019 | | | |
| | admixed | 10.2 | 7.73 | 25.00 | 0.1028 | 7.5604 | | | |
| Experiment 3 | ANU | 6.8 | 21.95 | 50.00 | 0.1061 | 10.0098 | 7.6190 | 1.61 | 21.08% |
| | sucrose | 8.5 | 12.89 | 50.00 | 0.0753 | 7.1028 | | | |
| | solution | 6.4 | 15.54 | 50.00 | 0.0704 | 6.6456 | | | |
| | admixed | 5.9 | 16.85 | 50.00 | 0.0712 | 6.7179 | | | |
| Experiment 4 | ANU | 5.9 | 21.42 | 50.00 | 0.0926 | 7.8517 | 8.9640 | 1.97 | 22.00% |
| | sucrose | 7.0 | | Sample lost | | | | | |
| | solution | 5.7 | 21.91 | 50.00 | 0.0920 | 7.7990 | | | |
| | admixed | 6.4 | 28.39 | 50.00 | 0.1326 | 11.2412 | | | |

The term 'sample lost' refers to the situation where no reading was obtained. This might be because there is no current for example.

CONCLUSIONS

Surprisingly, $^{14}C$ was detected using the method of sample preparation as provided by the present invention.

In the direct sample addition to graphite work, the addition of cobalt to the sample and graphite:aluminium powder mixture seemed to cause the number of counts to be reduced by approximately half. The pMC of the same samples with and without cobalt however, remain similar.

One of the parameters used as CBAMS acceptance criteria to determine whether a data point is valid or not, is the $^{13}C/^{12}C$ ratio. To be acceptable the $^{13}C/^{12}C$ ratio of a sample should be within the limits 0.935-1.265 (ie. 1.1±15%). The $^{13}C/^{12}C$ ratio of all samples from these analyses are within this range.

As expected, when the samples were counted for 3000 cycles instead of 1000, the number of counts increased at least approximately threefold. This is expected because a longer cycle allows for the production of a greater number of ions. For the HPLC grade water approximately two times more counts are detected at 3000 cycles.

Conventional preparation of plasma samples produces dpm/ml values that are highly reproducible and reveal dpm/ml figures close to the expected when the untreated (blank) plasma dpm/ml figure is subtracted. The same observations can be made of the admixed plasma data. This indicates a successful and accurate admixing process.

Data for the urine samples tended to be slightly more variable than the plasma data. Following untreated (blank) urine dpm/ml subtraction however, the resultant dpm/ml values were close to the nominal values.

The admixed ANU sucrose solution data obtained for each test was converted to dpm/g of sucrose. In the test data shown, the mean dpm/g values were within the theoretical dpm/g range as calculated using pMC values obtained following conventional processing as described above. Since the admixing data for the National Standard has been calculated to fall within the expected range, the tests conducted have provided sound evidence that the admixing method can produce reliable and accurate data, while at the same time reducing sample preparation time.

The reported data supports the use of direct sample introduction into the AMS ion source rather than going through a lengthy graphitisation process. Similar methodology could be used for other elemental isotopes analysable by AMS eg. $^{41}Ca$, $^{129}I$, $^{36}Cl$ etc. The applications of the method of the present invention are wide. The method of the invention may for example have potential value in monitoring the exposure of certain worker categories to plutonium where it could be successfully used for rapid and direct assessment of urine samples by AMS.

It should also be understood that the method of the present invention is similarly not limited to those binding materials which are specifically exemplified above. A range of binders may be suitable and are covered by the present invention. The specific choice of binder will depend upon the particular isotope to be tested. In the case of plutonium for example, a binding material of aluminium oxide and iron oxide is necessary to achieve a signal using AMS.

The invention claimed is:

1. A method of obtaining a quantitative measurement of elemental isotope ratios present in an essentially biological material comprising the steps of:
    (a) preparing a sample including the essentially biological material, wherein said material is mixed with a binder and wherein said prepared material is substantially chemically unaltered;
    (b) carrying out accelerator mass spectrometry on said material; and
    (c) quantifying the data generated from carrying out accelerator mass spectrometry, whereby the quantitative measurement of elemental isotope ratios is obtained.

2. A method according to claim 1 wherein the sample forming step includes a drying step.

3. A method according to claim 1 wherein the binder is electrically conductive.

4. A method according to claim 1 wherein the binder is any substance which allows the mixture of material and binder to be compressed into tablet form.

5. A method according the claim 1 wherein the binder is one or a mixture of any of graphite, cobalt, aluminum powder, aluminum oxide, iron or iron oxide.

6. A method according to claim 1 wherein the material is carbon containing.

7. A method according to claim 6 wherein the isotope to be detected is $^{14}C$ and the binder is one or a mixture of graphite, cobalt and aluminum powder.

8. A method according to claim 1 wherein the isotope to be detected is plutonium and the binder is one or a mixture of aluminum oxide and iron oxide.

9. A method according to claim 1 wherein the essentially biological material is an organ, blood, urine, cells or parts of cells of living hosts.

10. A method according to claim 1 wherein the essentially biological material is human blood plasma or urine.

* * * * *